(12) United States Patent
Manahan et al.

(10) Patent No.: US 10,302,230 B2
(45) Date of Patent: May 28, 2019

(54) FIELD SERVICEABLE CONDUIT RECEIVERS

(71) Applicants: Joseph Michael Manahan, Manlius, NY (US); Bradford James Morse, Syracuse, NY (US)

(72) Inventors: Joseph Michael Manahan, Manlius, NY (US); Bradford James Morse, Syracuse, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 1209 days.

(21) Appl. No.: 14/299,969

(22) Filed: Jun. 9, 2014

(65) Prior Publication Data

US 2015/0354739 A1 Dec. 10, 2015

(51) Int. Cl.
*F16L 25/02* (2006.01)
*F16L 21/00* (2006.01)
*H02G 3/38* (2006.01)
*H02G 3/06* (2006.01)
*F16L 19/02* (2006.01)

(52) U.S. Cl.
CPC ............ *F16L 25/025* (2013.01); *F16L 21/00* (2013.01); *H02G 3/06* (2013.01); *H02G 3/38* (2013.01); *F16L 19/0206* (2013.01)

(58) Field of Classification Search
CPC ........... F16L 21/03; F16L 21/08; F16L 25/06; H02G 3/0481; H02G 3/06
See application file for complete search history.

(56) References Cited

U.S. PATENT DOCUMENTS

| | | | |
|---|---|---|---|
| 3,109,052 A | 10/1963 | Dumire et al. |
| 3,332,272 A | 7/1967 | Tonchen |
| 3,596,939 A | 8/1971 | Gibson |
| 3,686,747 A | 8/1972 | Bagnulo |
| 3,703,303 A | 11/1972 | Eidelberg |

(Continued)

FOREIGN PATENT DOCUMENTS

| | | |
|---|---|---|
| CN | 2530373 | 1/2003 |
| CN | 201016420 | 2/2008 |

(Continued)

OTHER PUBLICATIONS

Cooper Industries Inc. Crouse-Hinds Division, Conduit Body Wire Pulling Instructions, IF964, Jun. 1993, pp. 1-2.

(Continued)

*Primary Examiner* — James M Hewitt, II
(74) *Attorney, Agent, or Firm* — King & Spalding LLP

(57) ABSTRACT

A field serviceable conduit receiver can include an adapter and a coupling device. The adapter can have an adapter cavity traversing therethrough. The adapter can include an adapter base configured to couple to an end of a conduit, and an adapter body located adjacent to the adapter base. The coupling device can be located adjacent to the adapter and have a coupling device cavity traversing therethrough. The coupling device can include a coupling base configured to be disposed around an outer surface of the conduit, and a coupling body located adjacent to the coupling base, where the coupling body has at least one coupling feature that is configured to removably couple to a complementary coupling feature disposed on a wall of the enclosure.

20 Claims, 4 Drawing Sheets

(56) References Cited

U.S. PATENT DOCUMENTS

| | | | |
|---|---|---|---|
| 3,744,007 A | 7/1973 | Horak | |
| 3,872,707 A | 3/1975 | Broske | |
| 3,895,177 A | 7/1975 | Muslin | |
| 3,993,333 A | 11/1976 | Biswas | |
| 4,019,762 A | 4/1977 | Eidelberg et al. | |
| 4,030,742 A | 6/1977 | Eidelberg et al. | |
| 4,170,125 A | 10/1979 | Minka | |
| 4,292,833 A | 10/1981 | Lapp | |
| 4,338,793 A * | 7/1982 | O'Hern, Jr. | F25B 45/00 137/231 |
| 4,440,425 A | 4/1984 | Pate et al. | |
| 4,484,770 A * | 11/1984 | Sloane | F16L 9/14 285/133.21 |
| 4,524,999 A | 6/1985 | Pate et al. | |
| 4,541,658 A | 9/1985 | Bartholomew | |
| 4,647,074 A | 3/1987 | Pate et al. | |
| 4,726,399 A * | 2/1988 | Miller | F16L 41/021 137/597 |
| 4,784,412 A * | 11/1988 | Van Dongen | F16L 19/0231 285/133.4 |
| 4,846,506 A | 7/1989 | Bocson et al. | |
| 4,921,456 A | 5/1990 | French | |
| 5,067,754 A | 11/1991 | Bartholomew | |
| 5,069,489 A | 12/1991 | Bartholomew | |
| 5,168,618 A | 12/1992 | Unewisse et al. | |
| 5,208,427 A | 5/1993 | Couto et al. | |
| 5,267,877 A | 12/1993 | Scannelli et al. | |
| 5,288,087 A | 2/1994 | Bertoldo | |
| 5,293,903 A * | 3/1994 | Appelwick | E03C 1/023 137/887 |
| 5,308,122 A * | 5/1994 | Crawford | F16L 19/065 285/332.4 |
| 5,782,508 A | 7/1998 | Bartholomew | |
| 5,797,629 A | 8/1998 | Beagle | |
| 5,803,511 A | 9/1998 | Bessette | |
| 5,829,795 A | 11/1998 | Riesselmann | |
| 6,170,886 B1 | 1/2001 | Bartholomew | |
| 6,250,692 B1 | 6/2001 | Ito et al. | |
| 6,450,549 B1 | 9/2002 | Schutz | |
| 6,753,470 B1 | 6/2004 | Johnson | |
| 6,805,385 B2 | 10/2004 | Viegener | |
| 6,843,096 B2 | 1/2005 | Viegener et al. | |
| 6,843,678 B2 | 1/2005 | DeWitt et al. | |
| 7,316,429 B2 | 1/2008 | Viegener | |
| 7,384,074 B2 | 6/2008 | He | |
| 7,644,959 B2 | 1/2010 | Guest | |
| 7,658,419 B2 | 2/2010 | Viegener et al. | |
| 7,690,693 B2 | 4/2010 | Moner et al. | |
| 7,841,630 B1 | 11/2010 | Auray et al. | |
| 8,202,130 B2 | 6/2012 | Friese et al. | |
| 8,205,915 B1 | 6/2012 | Crompton et al. | |
| 8,274,000 B2 | 9/2012 | Smith | |
| 8,308,201 B2 | 11/2012 | Duquette et al. | |
| 2006/0001260 A1* | 1/2006 | Thompson | F16L 41/03 285/125.1 |
| 2007/0018450 A1 | 1/2007 | Golafshani | |
| 2009/0026764 A1 | 1/2009 | Beckmann et al. | |
| 2009/0102184 A1 | 4/2009 | Lechner et al. | |
| 2010/0244436 A1 | 9/2010 | Mester | |
| 2010/0289255 A1 | 11/2010 | Cordes et al. | |
| 2011/0309611 A1 | 12/2011 | Smith | |
| 2011/0309614 A1 | 12/2011 | Guest | |
| 2012/0001414 A1 | 1/2012 | Arning et al. | |
| 2012/0161438 A1 | 6/2012 | Rischen et al. | |
| 2012/0174383 A1 | 7/2012 | Artaud et al. | |
| 2013/0072057 A1 | 3/2013 | Burris | |
| 2013/0082461 A1 | 4/2013 | Hunter | |

FOREIGN PATENT DOCUMENTS

| | | |
|---|---|---|
| CN | 101966065 | 2/2011 |
| CN | 103748398 | 4/2014 |
| CN | 103814481 | 5/2014 |
| DE | 19856766 | 7/2000 |
| DE | 10000868 | 7/2001 |
| DE | 20300918 | 3/2003 |
| DE | 10321300 | 12/2004 |
| EP | 1265018 | 12/2002 |
| EP | 1591176 | 11/2005 |
| EP | 2236889 | 10/2010 |
| EP | 2469142 | 6/2012 |
| JP | 2001208243 | 8/2001 |

OTHER PUBLICATIONS

Machine translation of JP2001208243 via LexisNexis Total Patent, dated Dec. 11, 2017, 5 pages.
Machine translation of EP2469142 via LexisNexis Total Patent, dated Dec. 11, 2017, 14 pages.
Machine translation of EP2236889 via LexisNexis Total Patent, dated Dec. 11, 2017, 9 pages.
Machine translation of EP1265018 via LexisNexis Total Patent, dated Dec. 11, 2017, 6 pages.
Machine translation of DE20300918 via LexisNexis Total Patent, dated Dec. 11, 2017, 5 pages.
Machine translation of DE19856766 via LexisNexis Total Patent, dated Dec. 11, 2017, 5 pages.
Machine translation of DE10321300 via LexisNexis Total Patent, dated Dec. 11, 2017, 4 pages.
Machine translation of CN2530373 via LexisNexis Total Patent, dated Dec. 11, 2017, 5 pages.
Chinese Office Action issued in Application No. 201510305790.9 dated Nov. 13, 2017, 8 pages, issued by the State Intellectual Property Office of the People's Republic of China, machine translation included 4 pages.
Machine translation of DE10000868 via LexisNexis Total Patent, dated Dec. 14, 2017, 4 pages.
Machine translation of EP1591176 via LexisNexis Total Patent, dated Dec. 14, 2017, 6 pages.
UL 1203, Standard for Safety, Dust-Ignition-Proof Electrical Equipment for Use in Hazardous (Classified), Apr. 30, 2018, Table of Contents pp. 3-9, Glossary pp. 12-13, Part I 13-60A, Document Was Downloaded by Gary Osborne For Use by Cooper Crouse-Hinds Osborne, Gary : May 2, 2018—6:29 AM.
International Electrotechnical Commision, International Standard, IEC 60079-1, Edition 7.0, 2014, i30 pages, items included Table of Contents, Sections 1-5 and Section 13, Geneva, Switzerland.
CSA Standard C22.2 No. 30-M1986, Explosion-Proof Enclosures for Use in Class I Hazardous Locations, 52 pages, published in Nov. 1986.
Chinese Office Action received in CN Application No. 201510307156. 9, dated Dec. 12, 2018, with translation 12 pages.
Machine translation of CN101966065 via LexisNexis Total Patents 11 pages.
Machine translation of CN103748398 via LexisNexis Total Patents 14 pages.
Machine translation of CN103814481 via LexisNexis Total Patents 18 pages.
Machine translation of CN201016420 via LexisNexis Total Patents 3 pages.

* cited by examiner

FIELD SERVICEABLE CONDUIT RECEIVERS

TECHNICAL FIELD

Embodiments of the invention relate generally to cabling and wiring systems, and more particularly to systems, methods, and devices for field serviceable conduit receivers of such a cable and wiring system.

BACKGROUND

Cable and wiring systems (called cabling systems herein) can require a lot of time and material to assemble. For example, rigid conduit can be run over significant distances. Some cabling systems require, at least to some extent, that one or more cables be enclosed (sometimes called an enclosed raceway). In such a case, rigid conduit can be used. Rigid conduit is made in fixed lengths, and so a person (usually an electrician) installing rigid conduit as part of a cabling system may have to perform a number of tasks with respect to the rigid conduit. For example, the installer may have to cut a length of conduit to size, as well as shape a conduit pipe according to a particular curvature required based on the path to be followed.

In addition, the conduit pipe may need to be threaded at one or both ends. This process can be time-consuming and messy. Further, if the conduit pipe is part of an explosion-proof (or equivalent) system, the threads etched onto the conduit pipe need to be precise, which takes more time. In a cabling system, a conduit pipe can be joined to another conduit pipe and/or an enclosure (e.g., a fitting, a connector, a junction box, a motor control center, a switchgear cabinet, a control cabinet). Conduit pipe in such cases is joined using mating threads. Even if a conduit pipe has mating threads disposed on each end, when a conduit pipe is cut to size, mating threads must be etched into the end of the conduit pipe. This process can be messy (leaving, for example, metal shavings and oil stains) and time consuming. Also, a conduit system, when assembled, is rigid, allowing for little if any independent movement of its components.

SUMMARY

In general, in one aspect, the disclosure relates to a field serviceable conduit receiver. The field serviceable conduit receiver can include an adapter and a coupling device. The adapter of the field serviceable conduit receiver can have an adapter cavity traversing therethrough. The adapter of the field serviceable conduit receiver can include an adapter base configured to couple to an end of a conduit, and an adapter body located adjacent to the adapter base. The coupling device of the field serviceable conduit receiver can be located adjacent to the adapter and have a coupling device cavity traversing therethrough. The coupling device of the field serviceable conduit receiver can include a coupling base configured to be disposed around an outer surface of the conduit. The coupling device of the field serviceable conduit receiver can also include a coupling body located adjacent to the coupling base, where the coupling body includes at least one coupling feature that is configured to removably couple to a complementary coupling feature disposed on a wall of the enclosure.

In another aspect, the disclosure can generally relate to a system. The system can include a conduit having a conduit end. The system can also include an enclosure having at least one wall forming a cavity, and a receiving feature disposed in the at least one wall. The receiving feature of the enclosure can include an aperture that traverses that at least one wall, and an enclosure coupling feature disposed on the at least one wall adjacent to the aperture. The system can further include a field serviceable conduit receiver coupled to the conduit and removably coupled to the enclosure. The field serviceable conduit receiver can include an adapter and a coupling feature. The adapter of the field serviceable conduit receiver can include an adapter having an adapter cavity traversing therethrough, and an adapter body located adjacent to the adapter base, where the adapter body is positioned between the conduit and the at least one wall of the enclosure. The coupling feature of the field serviceable conduit receiver can be located adjacent to the adapter and have a coupling device cavity traversing therethrough. The coupling feature of the field serviceable conduit receiver can include a coupling base disposed at least around an outer surface of the conduit. The coupling feature of the field serviceable conduit receiver can also include a coupling body located adjacent to the coupling base, where the coupling body has at least one coupling feature removably coupled to the enclosure coupling feature.

These and other aspects, objects, features, and embodiments will be apparent from the following description and the appended claims.

BRIEF DESCRIPTION OF THE DRAWINGS

The drawings illustrate only example embodiments of field serviceable conduit receivers and are therefore not to be considered limiting of its scope, as field serviceable conduit receivers may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
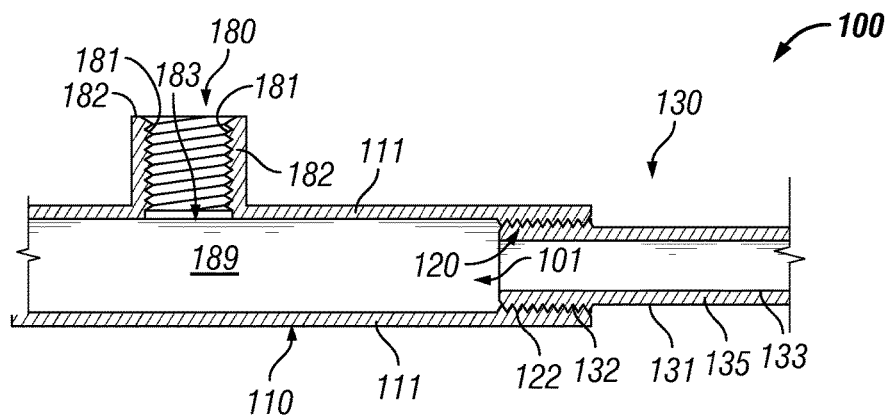
FIG. 1 shows a conduit system that includes an enclosure with conduit receivers currently known in the art.

The example embodiments discussed herein are directed to systems, apparatuses, and methods of field serviceable conduit receivers. While the example field serviceable conduit receivers shown in the Figures and described herein are directed to conduit for electrical cable (sometimes referred to herein as "cable"), example field serviceable conduit receivers can also be used with other devices aside from conduit for electrical cable, including but not limited to pipe for gases, pipe for fluids, and pipe for structural purposes (e.g., shelving, frames). Thus, the examples of field serviceable conduit receivers described herein are not limited to conduit for electrical cables.

As defined herein, the term "field serviceable" means that an example conduit receiver can be installed, removed, replaced, adjusted, reinstalled, and/or otherwise serviced by a user in the field. More specifically, "field serviceable" is where a conduit pipe and/or enclosure of a conduit system can be removed without also removing, altering, and/or damaging one or more other components of the conduit system. As described herein, a user can be any person that interacts with example field serviceable conduit receivers or a portion thereof. Examples of a user may include, but are not limited to, an engineer, an electrician, a maintenance technician, a mechanic, an operator, a consultant, a contractor, a homeowner, and a manufacturer's representative.

The field serviceable conduit receivers described herein can be physically placed in outdoor environments. In addition, or in the alternative, example field serviceable conduit receivers can be subject to extreme heat, extreme cold, moisture, humidity, high winds, dust, chemical corrosion, and other conditions that can cause wear on the field serviceable conduit receivers or portions thereof. In certain example embodiments, the field serviceable conduit receivers, including any portions thereof, are made of materials that are designed to maintain a long-term useful life and to perform when required without mechanical failure.

Any component described in one or more figures herein can apply to any subsequent figures having the same label. In other words, the description for any component of a subsequent (or other) figure can be considered substantially the same as the corresponding component described with respect to a previous (or other) figure. Further, if a component associated with a figure is described but not expressly shown or labeled in the figure, a corresponding component shown and/or labeled in another figure can be inferred. The numbering scheme for the components in the figures herein parallel the numbering scheme for the components of previously or subsequently described figures in that each component is a three digit number having the identical last two digits.

Example embodiments of field serviceable conduit receivers will be described more fully hereinafter with reference to the accompanying drawings, in which example embodiments of field serviceable conduit receivers are shown. Field serviceable conduit receivers may, however, be embodied in many different forms and should not be construed as limited to the example embodiments set forth herein. Rather, these example embodiments are provided so that this disclosure will be thorough and complete, and will fully convey the scope of field serviceable conduit receivers to those of ordinary skill in the art. Like, but not necessarily the same, elements (also sometimes called modules) in the various figures are denoted by like reference numerals for consistency.

Terms such as "first," "second," "end," "distal," and "proximal" are used merely to distinguish one component (or part of a component or state of a component) from another. Such terms are not meant to denote a preference or a particular orientation. Also, the names given to various components described herein are descriptive of one embodiments and are not meant to be limiting in any way. Any feature and/or component shown and/or described in one embodiment (e.g., in a figure) herein can be used in any other embodiment (e.g., in any other figure) herein, even if not expressly shown and/or described in such other embodiment.

FIG. 1 shows a conduit system 100 that includes an outlet box 110 (more generally referred to herein as an enclosure 110) with traditional conduit receivers 120 currently known in the art. The enclosure 110 includes at least one wall 111 that forms a cavity 189. The wall 111 can have one or more additional conduit receivers (e.g., conduit receiver 180) disposed within the wall 111 of the enclosure 110. In this case, none of the conduit receivers in the conduit system 100 is field serviceable because. The conduit system 100 is rigid throughout, which means that there is little or no tolerance for movement along the length-wise axis of the conduit 130. Thus, while the mating threads in theory allow two components of the conduit system to become mechanically decoupled, a particular component (e.g., conduit 130) could not be removed from the conduit system 100 without the risk of moving, altering, and/or damaging one or more other (e.g., adjacent) components of the conduit system 100.

Further, because the conduit 130 must be threaded at both ends to be removed without altering and/or damaging the conduit 130, the amount of movement along the length-wise axis of the conduit 130 must be twice as great. The conduit receiver 180 extends outward from the wall 111 of the enclosure 110 and has a wall 182 with mating threads 181 disposed on the inner surface of the wall 182. The mating threads 181 are disposed toward the distal end of the wall 182. The wall 182 forms a cavity 183 that merges into the cavity 189 of the enclosure 110.

In addition, or in the alternative, there can be one or more apertures (not shown in FIG. 1) that traverse the wall 111 and are normally covered by a cover (e.g., a threaded plug) (also not shown), which can be field serviceable. The wall 111 can be made of one or more of a number of suitable materials, including but not limited to steel, plastic, stainless, aluminum, and ceramic. Each traditional conduit receiver 120 of FIG. 1 has mating threads 122 disposed on its inner (as shown in FIG. 1) or outer surface at the distal end of each traditional conduit receiver 120. Each traditional conduit receiver 120 has a cross-sectional shape that is substantially circular and has a size that is substantially similar to the size (e.g., a trade size, including but not limited to ½ inch, 1½ inch, 2 inch, and 6 inch) of a conduit 130.

The conduit 130 (also called conduit pipe 130) has a wall 135 that has an inner surface 133 (corresponding to an inner diameter or an inner perimeter) and an outer surface 131 (corresponding to an outer diameter or an outer perimeter). The wall 135 forms a cavity 101 that traverses along its length. The conduit 130 has mating threads 132 that complement the mating threads 122 of the traditional conduit receiver 120 and allow the conduit 130 to couple to the traditional conduit receiver 120 of the enclosure 110. The mating threads 132 are disposed on the outer surface 131 (as shown in FIG. 1) or the inner surface 133 at the proximal end of the conduit 130.

Figure 2:
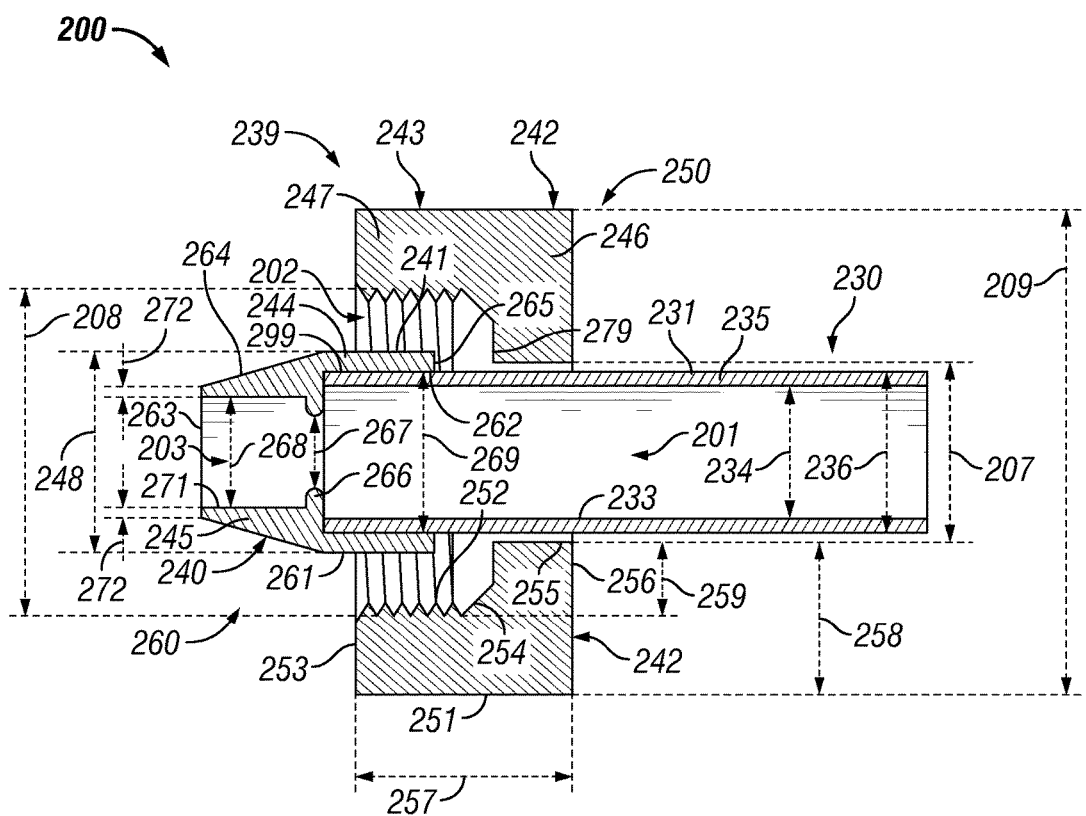
FIG. 2 shows a cross-sectional side view of a conduit system that includes a field serviceable conduit receiver in accordance with certain example embodiments.

FIG. 2 shows a cross-sectional side view of a conduit system 200 that includes a field serviceable conduit receiver 239 in accordance with certain example embodiments. In one or more embodiments, one or more of the components shown in FIG. 2 may be omitted, added, repeated, and/or substituted. Accordingly, embodiments of field serviceable conduit receivers should not be considered limited to the specific arrangements of components shown in FIG. 2.

Referring to FIGS. 1 and 2, the example field serviceable conduit receiver 240 can include one or more components. For example, as shown in FIG. 2, the field serviceable conduit receiver 239 can include an adapter 260 and a coupling device 250. The adapter 260 is configured to provide a transition between the conduit (e.g., conduit 230) and the enclosure. The coupling device 250 is configured to couple to the coupling feature of the enclosure and also secure the conduit.

In certain example embodiments, as shown in FIG. 2, the adapter 260 has an adapter base 241 and an adapter body 240 located adjacent to the adapter base 241. An adapter cavity 203 is disposed along the length of the adapter base 241 and the adapter body 240. The adapter base 241 of the adapter 260 has a shape and size that allows the adapter base 241 to couple to an end of the conduit 230. In other words, the conduit 230 is disposed within the portion of the adapter cavity 203 formed by the adapter base 241. The adapter base 241 can be coupled to the proximal end of the outer surface 231 of the conduit 230, as shown in FIG. 2. Alternatively, or in addition, the adapter base 241 of the adapter 260 can be coupled to the proximal end of the inner surface 233 of the conduit 230. The adapter base 241 can be coupled to the proximal end of the conduit 230 in one or more of a number of ways, including but not limited to fixedly, rotatably, slidably, and removably.

The adapter base 241 can be coupled to the proximal end of the conduit 230 using one or more of a number of coupling methods, including but not limited to crimping, welding, epoxy, mating threads, compression fittings, slotted receivers, and detents. For example, as shown in FIG. 2, a sealing compound 299 can be disposed between the adapter base 241 and the conduit 230. In such a case, the coupling method can serve one or more of a number of purposes. For example, the coupling method can eliminate or reduce egress between the adapter base 241 and the conduit 230. As another example, the coupling method can eliminate or reduce movement between the adapter base 241 and the conduit 230.

In certain example embodiments, the adapter base 241 can have one or more walls 244 having an inner surface 262, an outer surface 261, and an end surface 265. As mentioned above, the adapter base 241 can have a cross-sectional shape (e.g., circular) that is substantially the same as the cross-sectional shape of the conduit 230. In addition, the size (measured, for example, by the diameter 269 or the perimeter) of the inner surface 262 of the adapter base 241 can be substantially the same size as or slightly larger than the size (measured, for example, by the diameter 236 or the perimeter) of the outer surface 231 of the conduit 230. The adapter base 241 can be made of a malleable material, allowing the adapter base 241 to be shaped (e.g., crimped) against the outer surface 231 of the conduit 230.

Figure 3:
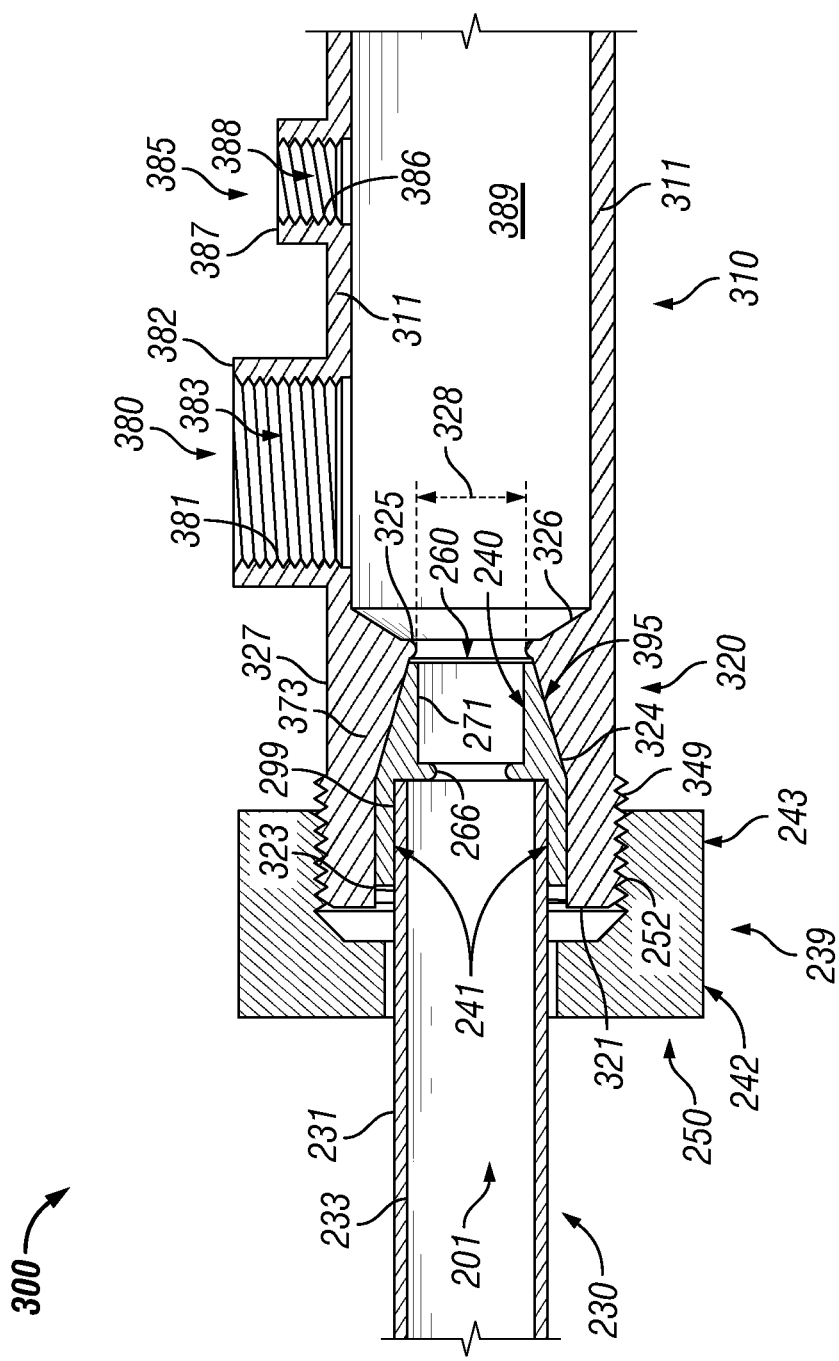
FIG. 3 shows a cross-sectional side of a conduit system that includes an enclosure with the field serviceable conduit receiver of FIG. 2 in accordance with certain example embodiments.

The size (measured, for example, by the diameter 248 or the perimeter) of the outer surface 261 of the adapter base 241 can be substantially the same size as, or slightly smaller than, a size of an aperture of a receiving feature of an enclosure, an example of which is shown in FIG. 3 below. Similarly, the cross-sectional shape of the outer surface 261 of the adapter base 241 can be substantially the same as the cross-sectional shape of the aperture of the receiving feature of the enclosure.

Figure 4:
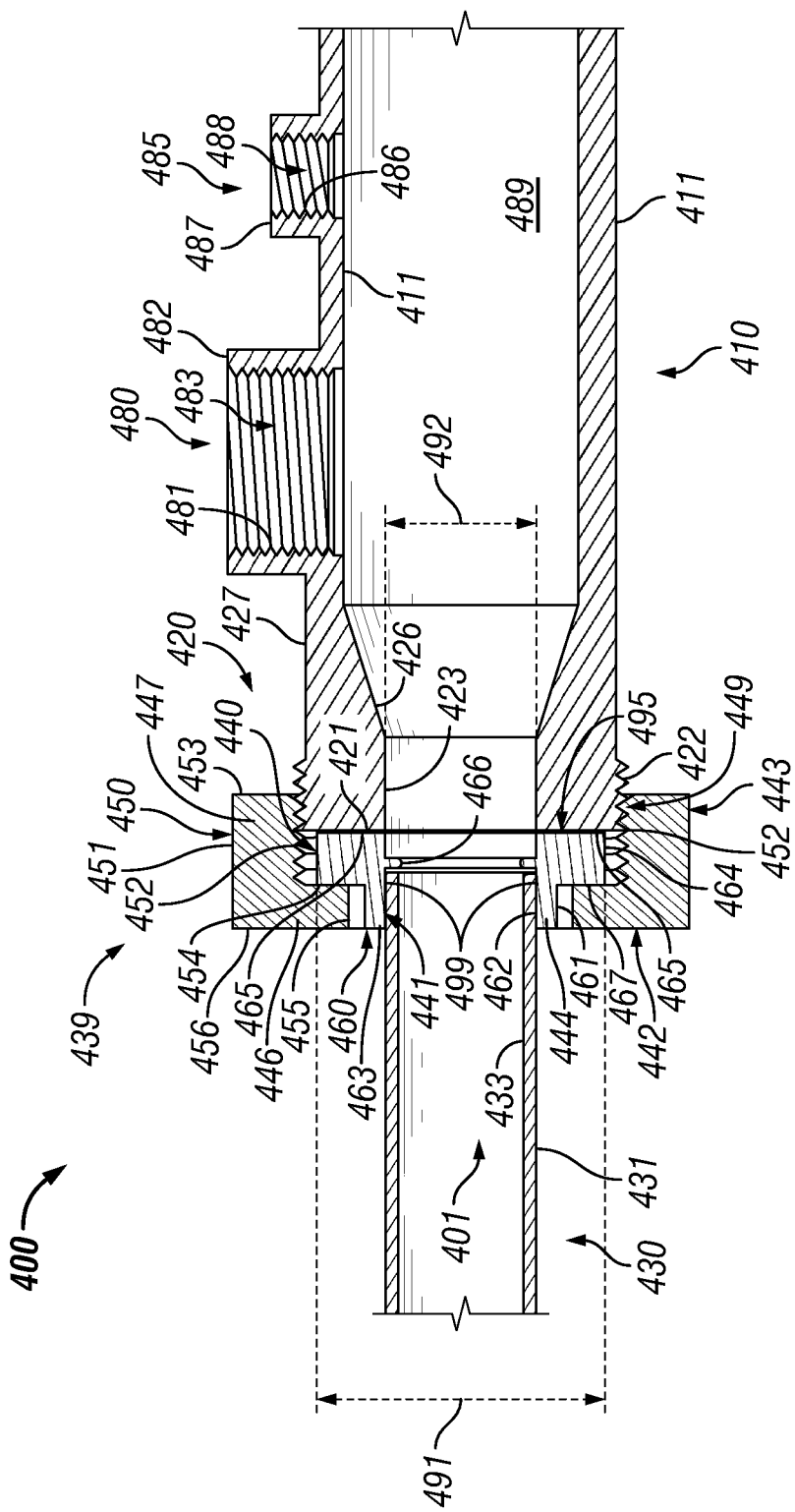
FIG. 4 shows a cross-sectional side of another conduit system that includes an enclosure with another field serviceable conduit receiver in accordance with certain example embodiments.
Figure 5:
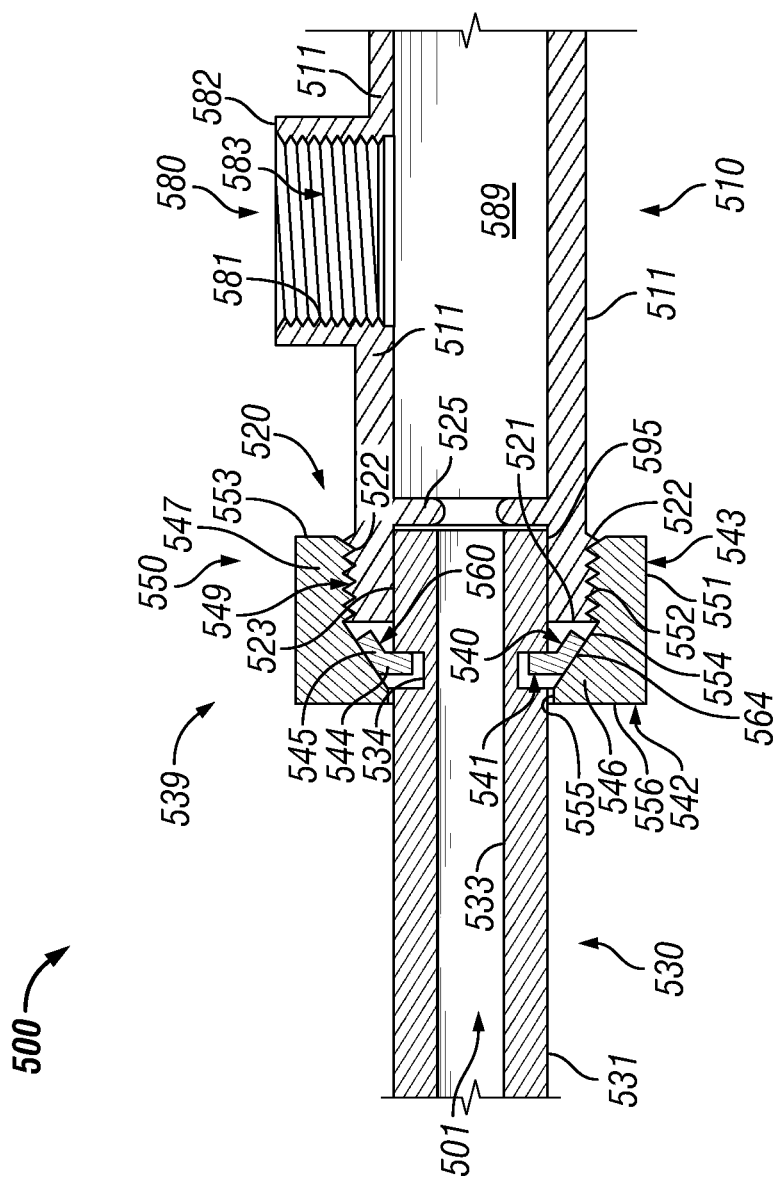
FIG. 5 shows a cross-sectional side of yet another conduit system that includes an enclosure with yet another a field serviceable conduit receiver in accordance with certain example embodiments.

In certain example embodiments, the adapter body 240 includes at least one wall 245 having an inner surface 271 and an outer surface 264. The outer surface 264 of the adapter body 240 can have a contour. The contour of the outer surface 264 of the adapter body 240 can have one or more of a number of shapes and sizes. For example, as shown in FIG. 2, the contour of the outer surface 264 of the adapter body 240 can be conical, decreasing in size as the outer surface 264 moves further away from the adapter base 241. As shown in FIGS. 3-5 below, the contour of the outer surface 264 of the adapter body 240 can be substantially the same as the contour of a corresponding portion of a conduit system against which the outer surface 264 abuts.

The adapter cavity 203 that traverses the adapter body 240 can be bounded by an inner surface 271. In such a case, the inner surface 271 can have one or more of a number of cross-sectional shapes and/or sizes. For example, as shown in FIG. 2, the inner surface 271 can have a cross-sectional shape that is substantially circular and having a diameter 268. In other words, the cross-sectional shape of the inner surface 271 can be substantially the same as the cross-sectional shape of the inner surface 233 of the conduit 230. In such a case, the diameter 268 (or the perimeter) of the inner surface 271 can be substantially the same as, or different (e.g., smaller, as shown in FIG. 2) than, the diameter 234 (or the perimeter) of the inner surface 233 of the conduit 230.

Optionally, in certain example embodiments, a bushing 266 can be disposed along some or all of the inner surface 271 of the adapter body 240. The bushing 266 can be used to protect electrical cable that is pulled through the adapter cavity 203 of the adapter 260 from being damaged by the proximal end of the conduit 230, which can have sharp and/or jagged edges. The bushing 266 can be disposed within the adapter cavity 203 of the adapter base 241. The bushing 266 can extend inward from the inner surface 271 toward the adapter cavity 203. Some or all of the distal portion of the bushing 266 can abut against some or all of the proximal end of the conduit 203. Further, the diameter 267 (or the perimeter) of the bushing 266 can be substantially the same as, or less than, the diameter 234 (or the perimeter) of the inner surface 233 of the conduit 230. In such a case, the distal end of the bushing 266 can cover the proximal end of the conduit 230.

The proximal end and at least the top portion of the distal end of the bushing 266 can have a rounded surface to increase the ease with which one or more electrical cables can be pulled through the adapter cavity 203 of the adapter body 240. The bushing 266 can be disposed within some or all of the adapter cavity 203 in a single, continuous piece or in multiple pieces. The bushing 266 can be made of one or more materials that are rigid or flexible, but that tend to offer little or no resistance to an electrical cable when the electrical cable slides across the bushing 266. The bushing 266 can be formed from a single piece with the rest of the adapter body 240, as from a mold. Alternatively, the bushing 266 can be one or more separate pieces that are mechanically coupled to the inner surface 271 of the wall 245 of the adapter body 240. In such a case, the bushing 266 can be coupled to the inner surface 271 of the wall 245 of the adapter body 240 using one or more of a number of coupling methods, including but not limited to welding, epoxy, fastening, and compression fittings.

The inner surface 271 and the outer surface 264 of the adapter body 240 can each be adjacent to the end surface 263 of the adapter body 240. The end surface 263 can have a height 272 defined by the inner surface 271 and the outer surface 264 of the adapter body 240. The end surface 263 of the adapter body 240 is located at the opposite end of the adapter 260 relative to the end surface 265 of the adapter base 241 along the length of the adapter 260. The adapter base 241 and the adapter body 240 can be formed from a single piece, as from a mold. Alternatively, the adapter base 241 and the adapter body 240 can be multiple pieces that are mechanically coupled to each other, directly or indirectly, using one or more of a number of coupling methods, including but not limited to crimping, welding, epoxy, mating threads, compression fittings, slotted receivers, fastening devices, rivets, and detents.

In certain example embodiments, as shown in FIG. 2, the coupling device 250 has a coupling base 242 and a coupling body 243 located adjacent to the coupling base 242. A coupling cavity 202 is disposed along the length of the coupling base 242 (formed, at least in part, by the inner surface 255 of the coupling base 242) and the coupling body 243 (formed, at least in part, by the coupling feature 252 of the coupling body 243). The inner surface 255 of the coupling base 242 of the coupling device 250 can have a cross-sectional shape and size that allows the coupling base 242 to abut against the outer surface 231 of the conduit 230. In other words, the conduit 230 is disposed within the portion of the coupling cavity 202 formed by the inner surface 255 of the coupling base 242. In some cases, the coupling base 242 can be coupled to the outer surface 231 of the conduit 230. The coupling base 242 can be coupled to the conduit 230 in one or more of a number of ways, including but not limited to rotatably, slidably, and removably. In any case, the coupling device 250 can freely move relative to the conduit 230.

In certain example embodiments, the coupling base 242 can have one or more walls 246 having an inner surface 255, an outer surface 251, an end surface 279, and an end surface 256. The inner surface 255 of the coupling base 242 can have a cross-sectional shape (e.g., circular) that is substantially the same as the cross-sectional shape of the outer surface 231 of the conduit 230. In addition, the size (measured, for example, by the diameter 207 or the perimeter) of the inner surface 255 of the coupling base 242 can be substantially the same size as or slightly larger than the size (measured, for example, by the diameter 236 or the perimeter) of the outer surface 231 of the conduit 230.

The size (measured, for example, by the diameter 209 or the perimeter) of the outer surface 251 of the coupling base 242 can be larger than a size of a receiving feature of an enclosure, an example of which is shown in FIG. 3 below. The cross-sectional shape of the outer surface 251 of the coupling base 242 can be substantially the same as, or different than, the cross-sectional shape of the receiving feature of the enclosure.

In certain example embodiments, the coupling body 243 includes at least one wall 247 having a coupling feature 249 disposed on an inner surface 252, the outer surface 251, and an end surface 253. The outer surface 251 of the coupling body 243 can be the same as the coupling body 251 of the coupling base 242. The cross-sectional shape and size (measured, for example, by the diameter 209 or the perimeter) of the outer surface 251 of the coupling body 243 can be substantially the same as the cross-sectional shape and size of the outer surface 251 of the coupling base 242. In some cases, one or more transitional surfaces can be included in the adapter 250. For example, as shown in FIG. 2, a transitional surface 254 can be positioned between the end surface 279 of the coupling base 242 and the inner surface 252 of the coupling body 243.

The coupling cavity 202 that traverses the coupling body 243 can be bounded by the inner surface 252. In such a case, the inner surface 252 of the coupling body 243 can have one or more of a number of cross-sectional shapes and/or sizes. For example, as shown in FIG. 2, the inner surface 252 can have a cross-sectional shape that is substantially circular and having a diameter 208. In other words, the cross-sectional shape of the inner surface 252 can be substantially the same as the cross-sectional shape of a receiving feature of an enclosure, an example of which is shown in FIG. 3 below. In such a case, the diameter 208 (or the perimeter) of the inner surface 252 can be larger than the diameter 236 (or the perimeter) of the outer surface 231 of the conduit 230.

In certain example embodiments, the coupling feature 249 is disposed on the inner surface 252 of the adapter body 243. The coupling feature 249 is configured to mate with (couple to) one or more complementary coupling features disposed on a receiving feature of an enclosure. In addition, or in the alternative, the coupling feature 249 can be disposed on one or more other portions of the coupling body 243. The coupling feature 249 can be one or more of a number of coupling features, including but not limited to detents, latches, slots, and tabs. The coupling feature 249 in this example is mating threads. The inner surface 252 of the coupling body 243 can be vertically offset from the inner surface 255 of the coupling base 242 by a height 259. The height 259 can be substantially the same as the height (thickness) of the adapter base 241 (which can be substantially the same as the height of the end surface 265 of the adapter base 241) added to the height of the receiving feature of an enclosure.

The inner surface 252 and the outer surface 251 of the coupling body 243 can each be adjacent to the end surface 253 of the coupling body 243. Similarly, the inner surface 255 and the outer surface 251 of the coupling base 242 can each be adjacent to the end surface 256 of the coupling base 242. The end surface 253 of the coupling body 243 is located at the opposite end of the coupling device 250 relative to the end surface 256 of the coupling base 242 along the length 257 of the coupling device 250. The height 258 of the coupling device 250 can be substantially the same as the height of the end surface 256. In certain example embodiments, the adapter 260 overlaps at least a portion of the coupling device 250 in a vertical plane (i.e., in a plane parallel to the length of the conduit 230, the adapter 260, and the coupling device 250).

FIG. 3 shows a cross-sectional side of a conduit system 300 that includes an enclosure 310 with the field serviceable conduit receiver 239 of FIG. 2 in accordance with certain example embodiments. In one or more embodiments, one or more of the components shown in FIG. 3 may be omitted, added, repeated, and/or substituted. Accordingly, embodiments of conduit systems with field serviceable conduit receivers should not be considered limited to the specific arrangements of components shown in FIG. 3.

In some cases, an enclosure (e.g., enclosure 310) is required to meet certain standards and/or regulations with respect to arresting flames and/or explosions. Such an enclosure can be called, for example, an explosion-proof enclosure or a flame-proof enclosure (generally called herein an explosion-proof enclosure). The enclosure 310 can be one or more of a number of different enclosures. Examples of such enclosures can include, but are not limited to, a fitting, a connector, a junction box, a motor control center, a switchgear cabinet, a control cabinet. In this example, as with the enclosure 110 of FIG. 1, the enclosure 310 is a CONDULET™. (CONDULET is a trademark of Cooper Industries, Inc. of Houston, Tex.) By opening one or more apertures in the enclosure 310, electrical cable can be accessed and pulled through the conduit 230.

An explosion-proof enclosure is an enclosure that is configured to contain an explosion or flame that originates inside the enclosure or propagates to the enclosure. Further, an explosion-proof enclosure can be configured to allow gases from inside the enclosure to escape across joints of the enclosure and cool as the gases exit the enclosure. The joints are also known as flame paths and exist where two surfaces meet and provide a path, from inside the explosion-proof enclosure to outside the explosion-proof enclosure, along which one or more gases may travel. A joint (flame path) may be a mating of any two or more surfaces. Each surface may be any type of surface, including but not limited to a flat surface, a threaded surface (as in this case for the traditional conduit receivers), and a serrated surface.

As mentioned above, an explosion-proof enclosure can be subject to meeting certain standards and/or requirements. For example, The National Electrical Manufacturers Association (NEMA) sets standards with which an enclosure must comply in order to qualify as an explosion-proof enclosure. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive.

Referring to FIGS. 1-3, the enclosure 310 in this case is configured substantially the same as the enclosure 110 of FIG. 1. The enclosure 310 has at least one wall 311 that forms a cavity 389. The enclosure 310 can include any of a number of conductor receivers (e.g., a conduit receiver 380, a conduit receiver 320) and one or more fill holes (e.g., fill hole 385). The conduit receiver 380 can extend outward from the wall 311 of the enclosure 310 and has a wall 382 with coupling features 381 (in this case, mating threads) disposed on the inner surface of the wall 382. The coupling features 381 can be disposed toward the distal end of the wall 382. The wall 382 can form a cavity 383 that merges into the cavity 389 of the enclosure 310.

The fill hole 385 similarly can extend outward from the wall 311 of the enclosure 310 and has a wall 387 with coupling features 386 (in this case, mating threads) disposed on the inner surface of the wall 387. The coupling features 386 can be disposed toward the distal end of the wall 387. The wall 387 can form a cavity 388 that merges into the cavity 389 of the enclosure 310. The fill hole 385 can be used to insert a sealing compound or some other compound into the cavity 389 of the enclosure 310. The fill hole 385 can be sealed with a plug or similar fastening and/or coupling device having coupling features that complement the coupling features 386 of the fill hole 385. The conduit receiver 320 of the enclosure 310 can also be called a receiving feature 320. The receiving feature 320 of the enclosure 310 can be disposed in the wall 311 and can include an aperture (hidden from view by the field serviceable conduit receiver 239 and the conduit 230) that traverses the wall 311 of the enclosure 310.

The receiving feature 320 can also include a coupling feature 322 (sometimes called an enclosure coupling feature 322) that is disposed on the wall 373 of the receiving feature 320. In some cases, the wall 373 can be the same as the wall 311 of the enclosure 310. The coupling feature 322 can be disposed at one or more locations on the wall 373. For example, as shown in FIG. 3, the coupling feature 322 can be disposed on the outer surface 327 of the wall 373. The diameter (or perimeter) of the coupling feature 322 can be substantially the same as, or slightly less than, the diameter 208 (or perimeter) of the coupling feature 249 disposed on the inner surface 252 of the adapter body 243. Thus, when the coupling feature 249 and the coupling feature 322 are mating threads, the coupling feature 249 and the coupling feature 322 can be threadably coupled (or coupled in some other fashion if other coupling features are used) to each other.

The receiving feature 320 can also include an end surface 321 that is adjacent to and positioned between the outer surface 327 and an inner surface 323. The inner surface 323 of the receiving feature 320 can have a shape that is substantially similar to the shape of the outer surface 261 of the adapter base 241. In addition, the inner surface 323 of the receiving feature 320 can have a size (e.g., the diameter, the perimeter) that is substantially similar to, or slightly larger than, the size (e.g., the diameter 248, the perimeter) of the outer surface 261 of the adapter base 241. In certain example embodiments, the receiving feature 320 can have more than one inner surface 323. In such a case, the receiving feature 320 can have an inner surface (e.g., inner surface 324) that forms a contour. The contour of an inner surface of the receiving feature 320 can be substantially the same as the contour of the outer surface 264 of the adapter body 240.

For example, as shown in FIG. 3, the contour of the inner surface 323 of the receiving feature 320 has a shape (in this case, conical) that is substantially the same as the shape of the contour of the outer surface 264 of the adapter body 240. In addition, the contour of the inner surface 323 of the receiving feature 320 has a size that is substantially the same as, or slightly larger than, the size of the contour of the outer surface 264 of the adapter body 240. This allows the adapter body 240 to abut against the inner surface 323 of the receiving feature 320.

The proximal end of the conduit 230 can be smooth, without rough edges. Alternatively, and more likely, the proximal end of the conduit 230 has rough edges, either in its manufactured state or when being cut to size by a user. As a result, a bushing can reduce or eliminate the likelihood of damage occurring to an electrical cable caused by the proximal end of the conduit 230 when the electrical cable is pulled through the conduit 230, the field serviceable conduit receiver 239, and/or the enclosure 310.

In this case, the height of the bushing 266 (measured, for example, by the diameter 267) exceeds the thickness of the conduit wall 235 (i.e., the distance between the outer surface 231 of the conduit wall 235 and the inner surface 233 of the conduit wall 235) by a distance (measured, for example, by the diameter 234, where the diameter 267 is less than the diameter 234). Since the diameter 267 is less than the diameter 234 and since the top side of the bushing 266 is rounded, an electrical cable can be pulled through the cavity 201 of the conduit 230 without the electrical cable contacting the proximal end of the conduit 230. In other words, any rough edges to the proximal end of the conduit 230 do not contact the electrical cable, reducing or preventing damage that can be caused when the electrical cable is pulled through the field serviceable conduit receiver 239.

Optionally, in certain example embodiments, a bushing 325 can be disposed along some or all of an inner surface (e.g., inner surface 324) of the receiving feature 320. The bushing 325 can be used to protect electrical cable that is pulled through the enclosure cavity 389 and/or the adapter cavity 203 from being damaged by the proximal end (e.g., where the end surface 263 adjoins with the inner surface 271) of the adapter 240, which can have sharp and/or jagged edges. The bushing 325 can be disposed adjacent to the adapter cavity 203 of the adapter base 241. The bushing 325 can extend inward from the inner surface (e.g., inner surface 324). Some or all of the distal portion of the bushing 325 can abut against some or all of the proximal end of the adapter body 240. Further, the diameter 260 (or the perimeter) of the bushing 325 can be substantially the same as, or less than, the diameter 268 (or the perimeter) of the inner surface 271 of the adapter body 240. In such a case, the distal end of the bushing 325 can cover the proximal end of the adapter body 240.

The proximal end and at least the top portion of the distal end of the bushing 325 can have a rounded surface to increase the ease with which one or more electrical cables can be pulled through the adapter cavity 203 of the adapter body 240. The bushing 325 can be disposed within some or all of the enclosure cavity 389 in a single, continuous piece or in multiple pieces. The bushing 325 can be made of one or more materials that are rigid or flexible, but that tend to offer little or no resistance to an electrical cable when the electrical cable slides across the bushing 325. The bushing 325 can be formed from a single piece with the rest of the receiving feature 320, as from a mold. Alternatively, the bushing 325 can be one or more separate pieces that are mechanically coupled to an inner surface (e.g., inner surface 324) of the wall 373 of the receiving feature 320. In such a case, the bushing 325 can be coupled to an inner surface of the wall 373 of the receiving feature 320 using one or more of a number of coupling methods, including but not limited to welding, epoxy, fastening, and compression fittings.

When the enclosure 310 is explosion-proof, flame-proof, and/or is required to meet one or more other similar standards, a flame path 395 can result between two or more components of the conduit system 300. In this example, a flame path 395 is disposed between the outer surface 264 of the adapter body 240 and the inner surface 324 of the receiving feature 320. The flame path 395 can also continue to be disposed between the outer surface 261 of the adapter base 241 and the inner surface 323 of the receiving feature 320.

FIG. 4 shows a cross-sectional side of another conduit system 400 that includes an enclosure 410 with another field serviceable conduit receiver 439 in accordance with certain example embodiments. In one or more embodiments, one or more of the components shown in FIG. 4 may be omitted, added, repeated, and/or substituted. Accordingly, embodiments of conduit systems with field serviceable conduit receivers should not be considered limited to the specific arrangements of components shown in FIG. 4.

Referring to FIGS. 1-4, the conduit system 400 of FIG. 4 is substantially the same as the conduit system 300 of FIG. 3, except as described below. Specifically, the configuration of the coupling device 450, the configuration of the adapter 460, the configuration of the receiving feature 420, and the interaction therebetween is different than what is shown in FIG. 3. In this example, there is no transitional surface between the coupling base 442 and the coupling body 443.

Also in this example, the adapter base 441 of the adapter 460 is substantially the same as the adapter base 241 of the adapter 260 of FIGS. 2 and 3, but the adapter body 440 of the adapter 460 is different. Specifically, the outer surface 464 of the adapter body 440 does not have a contour that varies along its length. Instead, the outer surface 464 of FIG. 4 does not substantially vary horizontally along its length. Also, the outer surface 464 has a diameter 491 (or perimeter) that is greater than the perimeter 448 (or perimeter) of the outer surface 461 of the adapter base 441.

The diameter 491 of the outer surface is greater than the diameter 492 of the inner surface 423 of the receiving feature 420. As a result, the adapter body 440 (and, more specifically, the end surface 465 at the proximal end of the adapter body 440) abuts against the end surface 421 of the receiving feature 420. In other words, in this example, no part of the adapter body 460 is disposed within the receiving feature 420. In certain example embodiments, the end surface 421 and the end surface 465 can include one or more features (e.g., serrations) that complement each other to generate a flame path 495 that would require a reduced distance (e.g., one half of the difference between the diameter 491 and the diameter 492) compared to when no such features are disposed on the end surface 421 and the end surface 465.

Further, in this example, while the adapter body 440 of FIG. 4 has a bushing 466 disposed on its inner surface 471 to protect an electrical cable from a sharp edge that forms on the inner surface 433 at the proximal end of the conduit 330, there is no bushing disposed within the receiving feature 420. In this case, the diameter 468 (or the perimeter) of the inner surface 471 is substantially the same as the diameter 492 (or perimeter) of the inner surface 423 of the receiving feature 420. In other words, there are no sharp or jagged edges within a cavity (adapter cavity 403) between the inner surface 471 of the adapter body 440 and the inner surface 423 of the receiving feature 420, and so a bushing is not needed to protect an electrical cable being pulled through such cavity. Further, the receiving feature 420 does not have an inner surface (such as inner surface 324 of FIG. 3) that forms a contour along its length.

In addition, in this case, the adapter 460 interacts more directly with the coupling device 450. For example, the end surface 454 of the coupling base 442 abuts against the end surface 467 of the adapter body 440 when the coupling device 450 is coupled to the receiving feature 420. For this to occur, the diameter 491 (or perimeter) of the outer surface 464 of the adapter body 440 can be less than the diameter 408 (or perimeter) of the inner surface 452 of the coupling body 443. Also, for this to occur, the length of the adapter body 440 (measured by the length of the outer surface 464) is less than the length of the coupling body 443 (measured by the length of the inner surface 452).

Further, some or all of the coupling base 442 in this case is disposed over the adapter base 441 when the coupling device 450 is coupled to the receiving feature 420. For this to occur, the diameter 448 (or perimeter) of the outer surface 461 of the adapter base 441 can be substantially the same as, or less than, the diameter 407 (or perimeter) of the inner surface 455 of the coupling base 442. In such a case, the length of the adapter base 441 (measured by the length of the outer surface 464) can be substantially the same as, or different than, the length of the coupling base 442 (measured by the length of the inner surface 455).

As with the conduit system 300 of FIG. 3, one or more flame paths can exist within the conduit system 400 of FIG. 4. For example, a flame path 495 can exist between the adapter body 440 (and, more specifically, the end surface 465 at the proximal end of the adapter body 440) and the end surface 421 of the receiving feature 420. Similarly, a flame path can exist between the end surface 454 of the coupling base 442 and the end surface 467 of the adapter body 440.

FIG. 5 shows a cross-sectional side of yet another conduit system 500 that includes an enclosure 510 with yet another a field serviceable conduit receiver 539 in accordance with certain example embodiments. In one or more embodiments, one or more of the components shown in FIG. 5 may be omitted, added, repeated, and/or substituted. Accordingly, embodiments of conduit systems with field serviceable conduit receivers should not be considered limited to the specific arrangements of components shown in FIG. 5.

Referring to FIGS. 1-5, the conduit system 500 of FIG. 5 is substantially the same as the conduit system 300 of FIG. 3 and/or the conduit system 400 of FIG. 4, except as described below. For example, the adapter base 541 of the adapter 560 is coupled to the conduit 530 in a different manner than shown previously. Specifically, there is a recess 534, originating at the outer surface 531, in the conduit wall 535 of the conduit 530. The recess 534 can be machined into the conduit wall 535, either in the field, at a manufacturing facility, or at any other suitable location. The distal end of the adapter base 541 can be disposed within some or all of the recess 534. While a sealing compound (such as the sealing compound 299 of FIG. 3) can be used, such a sealing compound is not required to maintain the mechanical coupling between the conduit 530 and the adapter 560. Instead, a downward force applied by the coupling device 550 on the adapter 560 can be used to keep the adapter base 541 disposed within the recess 534 in the conduit wall 535.

To apply the downward force on the adapter 560, the coupling device 550 and/or the adapter 560 can have one or more features disposed thereon. In this example, the coupling device 550 can have a transitional surface 554 that is at an oblique angle to both the inner surface 555 of the coupling base 542 and the inner surface 552 of the coupling body 543. In addition, in this example, the adapter base 541 and the adapter body 540 are set at substantially the same oblique angle relative to each other. As a result, when the adapter base 541 is positioned within the recess 534 in the conduit wall 535, the outer surface 564 is substantially parallel to, and abuts against (has a substantially similar contour to), the transitional surface 554. As the coupling device 550 couples to the coupling features 549 of the receiving feature 520 of the enclosure 510, the slope (which can also be called a contour) of the transitional surface 554 applies the downward force to the adapter body 540 (and, thus, the adapter base 541), forcing the adapter base 541 within the recess 534 in the conduit wall 535.

Because of the drastically different configuration of the adapter 560 of FIG. 5 relative to the adapters described above with respect to FIGS. 2-4, the proximal end of the conduit 530 abuts against a bushing 525 disposed on the inner surface 523 of the receiving feature 520. In other words, the conduit 530 completely traverses the adapter 560 of the conduit system 500 in FIG. 5. Further, as with the conduit system 400 of FIG. 4, there is no inner surface that forms a contour, such as the inner surface 324 of FIG. 3.

In certain example embodiments, a flame path 595 can exist between the outer surface 531 of the conduit 530 and the inner surface 523 of the receiving feature 520. In some cases, a second adapter, such as adapter substantially similar to the adapter 240 shown in FIGS. 2 and 3 above, can be coupled to the proximal end of the conduit 530, adding to the configuration shown in FIG. 5. In such a case, the second adapter could be precisely machined in a factory or manufacturing plant rather than in the field, providing a more precise flamepath 595.

The systems and methods described herein may provide several advantages including a significant savings in time and material for installing, modifying, and/or maintaining a conduit system. This allows for less costly, easier, and quicker installation, repair, and/or modification of conduit systems using example field serviceable conduit receivers. Example embodiments also provide more flexibility in where enclosures having example conduit receivers are located in a conduit and/or wiring system. Certain example embodiments provide a number of other benefits, as well, including but are not limited to use of fewer materials, reuse of conduit receivers, simplified installation, simplified inspection, simplified maintenance, and reduced cost.

In addition, using example field serviceable conduit receivers allow for compliance with one or more of a number of standards that require an enclosure and/or a conduit system to have a flame path. As a result, such an enclosure and/or conduit system can be flame-proof, explosion-proof, and/or have any other suitable designation required for one or more of a number of hazardous environments.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A field serviceable conduit receiver, comprising:
   an adapter having an adapter cavity traversing therethrough, wherein the adapter comprises:
      an adapter base configured to couple to an end of a conduit, wherein the conduit is located in a hazardous environment; and
      an adapter body located adjacent to the adapter base; and
   a coupling device located adjacent to the adapter and having a coupling device cavity traversing therethrough, wherein the coupling device comprises:
      a coupling base configured to be disposed around an outer surface of the conduit; and
      a coupling body located adjacent to the coupling base, wherein the coupling body comprises at least one coupling feature that is configured to removably couple to a complementary coupling feature disposed on a wall of an enclosure, wherein the enclosure is disposed in the hazardous environment adjacent to the end of the conduit,
   wherein the adapter body is configured to form a flame path with the coupling body and the enclosure when the enclosure is coupled to the coupling device, wherein the flame path meets construction requirements for explosion-proof enclosures, wherein the flame path is configured to quench an explosion that originates inside the enclosure, and wherein the flame path also is configured to allow gases from inside the enclosure to escape and cool as the gases exit the enclosure.

2. The field serviceable conduit receiver of claim 1, wherein the adapter body is configured to substantially abut against an inner surface of the wall of the enclosure.

3. The field serviceable conduit receiver of claim 1, wherein the adapter overlaps at least a portion of the coupling device in a plane parallel to a length of the adapter.

4. The field serviceable conduit receiver of claim 1, wherein the adapter base is configured to be positioned within a recess of the conduit.

5. The field serviceable conduit receiver of claim 1, wherein the adapter body further comprises a bushing disposed along its inner surface within the adapter cavity.

6. The field serviceable conduit receiver of claim 1, wherein the adapter body comprises at least one enclosure contour, wherein the at least one enclosure contour is configured to be substantially similar to a contour of a cavity of a receiving feature of an enclosure.

7. The field serviceable conduit receiver of claim 1, wherein the adapter body comprises at least one enclosure contour, wherein the at least one enclosure contour is configured to be substantially similar to a contour of an end of a receiving feature of an enclosure.

8. A system comprising:
a conduit comprising a conduit end, wherein the conduit is located in a hazardous environment;
an enclosure located in the hazardous environment, wherein the enclosure comprises:
at least one wall forming a cavity; and
a receiving feature disposed in the at least one wall, wherein the receiving feature comprises:
an aperture that traverses the at least one wall; and
an enclosure coupling feature disposed on the at least one wall adjacent to the aperture; and
a field serviceable conduit receiver coupled to the conduit and removably coupled to the enclosure in the hazardous environment, wherein the field serviceable conduit receiver comprises:
an adapter having an adapter cavity traversing therethrough, wherein the adapter comprises:
an adapter base coupled to the conduit end; and
an adapter body located adjacent to the adapter base, wherein the adapter body is positioned between the conduit and the at least one wall of the enclosure; and
a coupling device located adjacent to the adapter and having a coupling device cavity traversing therethrough, wherein the coupling device comprises:
a coupling base disposed at least around an outer surface of the conduit; and
a coupling body located adjacent to the coupling base, wherein the coupling body comprises at least one coupling feature removably coupled to the enclosure coupling feature,
wherein the adapter body and the receiving feature of the enclosure form a flame path, wherein the flame path meets construction requirements for explosion-proof enclosures, wherein the flame path is configured to quench an explosion that originates within the cavity of the enclosure, and wherein the flame path also is configured to allow gases from within the cavity of the enclosure to escape and cool as the gases exit the enclosure.

9. The system of claim 8, wherein the adapter base is coupled to the outer surface of the conduit.

10. The system of claim 8, wherein the adapter body comprises a bushing disposed along an inner adapter surface within the adapter cavity.

11. The system of claim 8, wherein the receiving feature of the enclosure further comprises an inner surface of the at least one wall, wherein the inner surface forms an enclosure contour, and wherein the adapter body substantially forms the enclosure contour.

12. The system of claim 11, wherein the adapter body is disposed within the cavity of the enclosure.

13. The system of claim 8, further comprising:
a sealing component disposed between the conduit and the adapter base.

14. The system of claim 8, wherein the adapter base is disposed between the conduit and the coupling base.

15. The system of claim 14, wherein the adapter body abuts against an end of the at least one wall of the enclosure.

16. The system of claim 15, wherein the adapter body and the end of the at least one wall of the enclosure each comprises a serrated surface that complement each other when the adapter body abuts against an end of the at least one wall of the enclosure.

17. The system of claim 8, wherein the conduit comprises a recess in an outer wall, wherein the adapter base is disposed within the recess.

18. The system of claim 17, wherein the adapter body forms a first contour that is substantially similar to a second contour formed by an inner surface of the coupling base.

19. The system of claim 17, wherein the conduit end abuts against a bushing disposed along an inner surface of the at least one wall of the enclosure.

20. A system comprising:
a conduit having a smooth outer surface;
at least one electrical cable disposed within the conduit;
an adapter having an adapter cavity traversing therethrough and lacking a liner used for transmitting liquids, wherein the adapter comprises:
an adapter base coupled to an end of the conduit; and
an adapter body located adjacent to the adapter base; and
a coupling device located adjacent to the adapter and having a coupling device cavity traversing therethrough, wherein the coupling device comprises:
a coupling base disposed around the smooth outer surface of the conduit; and
a coupling body located adjacent to the coupling base, wherein the coupling body comprises at least one coupling feature that is removably coupled to a complementary coupling feature disposed on a wall of an enclosure, inside of which the at least one electrical cable is further disposed.

* * * * *